United States Patent [19]

Entschel et al.

[11] 3,888,850
[45] June 10, 1975

[54] SUBSTITUTED P-AMINOSTYRYL 5-CHLOROINDOLINIUM DYES

[75] Inventors: Roland Entschel, Basel; Viktor Kaeppeli, Allschwil, Basel, both of Switzerland

[73] Assignee: Sandoz, Inc., Basel, Switzerland

[22] Filed: Apr. 9, 1973

[21] Appl. No.: 349,460

Related U.S. Application Data

[63] Continuation of Ser. No. 101,399, Dec. 24, 1970, abandoned.

[52] U.S. Cl. .................... 260/240.9; 8/7; 8/12; 8/62; 8/177; 8/178 R; 8/179; 260/37 R
[51] Int. Cl. ................................................ C09b 23/14
[58] Field of Search ..................... 260/240.9

[56] References Cited
UNITED STATES PATENTS

| | | | |
|---|---|---|---|
| 2,230,789 | 2/1941 | Winter et al. .................... | 260/240.9 |
| 2,242,474 | 5/1941 | Kochendoerfer et al. ....... | 260/240.9 |
| 2,734,901 | 2/1956 | Belcher ............................ | 260/240.9 |
| 2,850,520 | 9/1958 | Merian et al. ..................... | 260/465 |
| 3,652,283 | 3/1972 | Mackey ........................ | 260/240.9 X |

FOREIGN PATENTS OR APPLICATIONS

| | | | |
|---|---|---|---|
| 732,927 | 6/1969 | Belgium ........................... | 260/240.9 |
| 2,101,223 | 7/1971 | Germany ......................... | 260/240.9 |

OTHER PUBLICATIONS

Derwent Belgian Patents Report No. 47/69, gp. 3, page 4 (Jan. 2, 1970 abst. of Belgian Patent 732,927 issued 10-16-69).

Hamer, The Cyanine Dyes and Related Compounds, page 729 and Frontispage, Interscience Publishers (1964).
Venkataraman, The Chemistry of Synthetic Dyes, Vol. II, pp. 1173 to 1175, Academic Press, Inc. N.Y. (1952).
The Colour Index, 2nd Ed. Vol. 1, p. 1635, The Society of Dyes and Colourists (England) (1956).
The Colour Index, 2nd ed. 1956, Vol. 3, p. 3402, The Society of Dyers and Colourists (England).
The Colour Index, 2nd Ed. 1956, Vol. 4, p. 4292, The Society of Dyers and Colourists (England).

Primary Examiner—John D. Randolph
Attorney, Agent, or Firm—Melvyn M. Kassenoff; Gerald D. Sharkin; Richard E. Vila

[57] ABSTRACT

Dyes of the formula

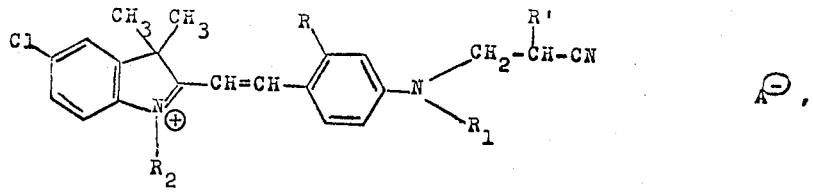

wherein R is lower alkyl or substituted lower alkyl,

R' is hydrogen or methyl, $R_1$ is alkyl of at least two carbon atoms, haloalkyl of at least two carbon atoms, aryl, substituted aryl, benzyl or substituted benzyl, $R_2$ is methyl or ethyl, and $A^-$ is an anion, are useful for dyeing and printing polymers and copolymers of acrylonitrile and polyamides and polyesters which have been modified by the introduction of acid groups.

4 Claims, No Drawings

SUBSTITUTED P-AMINOSTYRYL-5-CHLOROINDOLINIUM DYES

This application is a continuation of application Ser. No. 101,399, filed on Dec. 24, 1970, and now abandoned.

This invention relates to basic styryl dyes free from sulphonic acid groups which are suitable for exhaust dyeing, pad dyeing and printing of polyacrylonitrile and acrylonitrile copolymer fibres in the form of loose fibre, yarn or textiles, and of the polyacrylonitrile or acrylonitrile copolymer fiber component of blend yarns and fabrics. These dyes have the formula

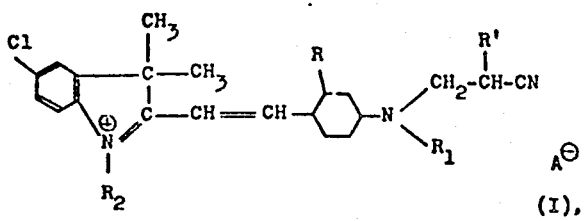

(I), where

R stands for a lower alkyl radical which may be substituted,

R' for hydrogen or methyl, $R_1$ for a straight or branched alkyl radical having at least two carbon atoms which may be substituted by halogen or for an aryl or benzyl radical which may be substituted, $R_2$ for methyl or ethyl, and $A^\ominus$ for an anion.

The new dyes of formula (I) can be produced by the reaction of a compound of the formula

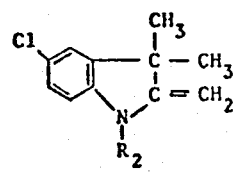

(II)

with a compound of the formula

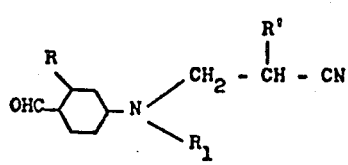

(III)

using an acid of the formula

(IV).

Alternatively, the reaction can be carried out in the presence of an acid of formula (IV) or the reaction product can be treated subsequently with an acid of this formula.

This invention comprises in particular basic styryl dyes of the formula

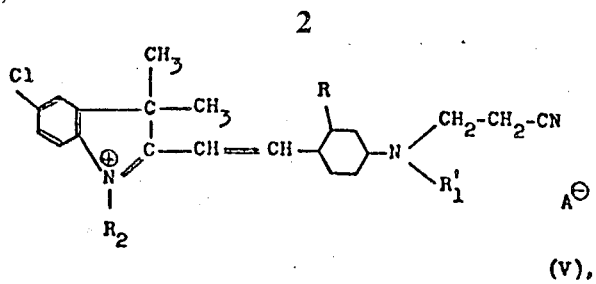

(V), where

R stands for a lower alkyl radical which may be substituted, $R'_1$ for a straight or branched alkyl radical which has at least two carbon atoms and may be substituted by halogen, $R_2$ for methyl or ethyl, and $A^\ominus$ for an anion.

The dyes of formula (V) can be obtained by reaction of a compound of formula (II) with a compound of the formula

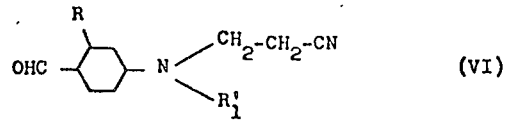

(VI)

using an acid of formula (IV).

Dyes of good quality are those of the formula

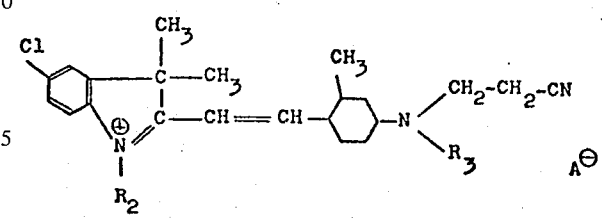

(VII), where $R_3$ stands for an ethyl, propyl or butyl radical, and in particular those of the formula

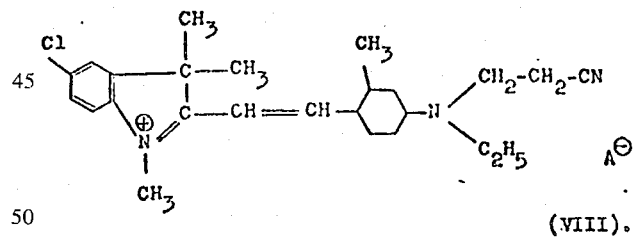

(VIII).

A further method of producing the dyes of formulae (I) and (V) is to methylate or ethylate, e.g., with dimethyl- or diethyl sulphate, a compound of the formula

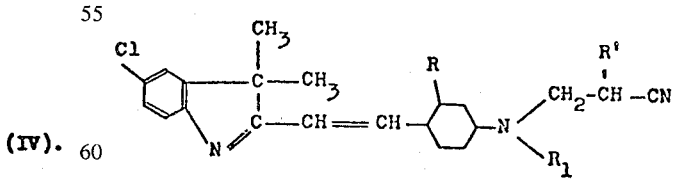

(IX).

The dyes of this invention are employed for dyeing, by exhaust or padding methods, and for printing polyacrylonitrile and acrylonitrile copolymer fibres, which may be present in loose form, as yarn, as textiles, or as a component of blend yarns or fabrics.

In addition these new dyes are used for dyeing and printing synthetic polyamide and polyester fibres which have been modified by the introduction of acid groups in manufacture. Polyamide fibres of this type are disclosed in Belgian Patent No. 706.104, while the corresponding polyester fibres are described in U.S. Pat. Nos. 3,018,272 and 3,379,723. The dyes have further uses for the coloration of plastics and the dyeing of leather and paper.

The standard practice is to dye from an aqueous medium of neutral or acid reaction in the temperature range of 60°–100°C, or at temperatures above 100°C under static pressure. Under these conditions the dyes give level dyeings without the assistance of retarders.

It has been found that mixtures of two or more of the new dyes and mixtures of these with other cationic dyes can be employed with good success, that is to say, the dyes show good compatibility in combined application.

The dyeings obtained on polyacrylonitrile and acrylonitrile copolymer fibres have good light fastness and good wet fastness properties, e.g. fastness to washing, water, sea water, cross dyeing, steam, dry cleaning, perspiration and solvents, along with good fastness to sublimation, pleating, decatizing and pressing. The dyes are well soluble, especially in water, and show good compatibility with salt, good pH-stability and good resistance to prolonged boiling. Fibres other than the aforesaid, such as natural and unmodified synthetic polyamide fibres, are reserved.

The dyes of this invention can be converted into solid or liquid dyeing preparations using standard methods, for example grinding, granulation, or dissolving in suitable solvents, if necessary with the addition of an assistant such as a stabilizer.

In the foregoing "halogen" is understood to refer to bromine, fluorine, iodine or more especially chlorine. The lower alkyl radicals, which are either straight or branched, may bear 1 to 6 or preferably 1 to 4 carbon atoms, and if they are substituted they contain in particular halogen atoms, hydroxyl or cyano groups, or aryl radicals such as phenyl radicals.

In such cases "alkyl" stands for an aralkyl radical such as benzyl radical. The aryl radicals are in the main phenyl radicals, which may be substituted, for example by halogen atoms, nitro, amino, cyano, hydroxyl, alkyl, alkoxy, trifluoroalkyl or trichloro alkyl groups. Alkoxy radicals may contain 1, 2 or 3 carbon atoms.

The anion $A^{\ominus}$ in the dyes of formulae (I) and (V) may if desired be exchanged for another anion, for example with the aid of an ion exchanger or by reaction with a salt or acid, if necessary in more than one step, e.g. via the hydroxide or bicarbonate.

The anion $A^{\ominus}$ may represent an organic or inorganic ion, e.g. a halide ion such as the chloride, bromide or iodide ions, or the sulphate, disulphate, methylsulphate, aminosulphate, perchlorate, carbonate, bicarbonate, phosphate, phosphorus molybdate, phosphorus tungstate, phosphorus tungstic molybdate, benzenesulphonate, naphthalenesulphonate, 4-chlorobenzenesulphonate, 4-methylbenzenesulphonate, oxalate, maleinate, acetate, propionate, lactate, succinate, chloroacetate, tartrate, methanesulphonate or benzoate ions; or alternatively $A^{\ominus}$ may represent a complex anion such as that of zinc chloride.

The reaction of a compound of formula (II) with a compound of formula (III) or (VI) is carried out preferably in an organic solvent such as acetic acid in the temperature range of 50° to 130°C, the optimum range being 70°–100°C. The reaction can, however, be effected in a mixture of water and an organic solvent and in the presence of mineral acids.

In the following Examples the parts and percentages are by weight and the temperatures are given in degrees centigrade.

EXAMPLE 1

208 Parts of 5-chloro-1,3,3,-trimethyl-2-methylene indoline (the Fischer chlorine base, prepared as given by G. Plancher in Berichte 31, 1496-97 (1898)) are stirred into 150 parts of acetic acid and 100 parts of water. 266 Parts of the aldehyde of the formula

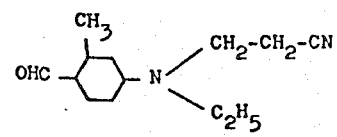

(produced from the corresponding m-toluidine derivative after E. Compaigne and W. L. Archer, J.Am.-Chem.Soc. 75, 991 (1963)) are added. This mixture is raised to 70°–80° and stirred for 3 hours at this temperature, after which 1000 parts of water, 10 parts of filter earth and 6 parts of activated carbon are added. Stirring is continued for 1 hour, then the reaction mixture is filtered.

The dye of the formula

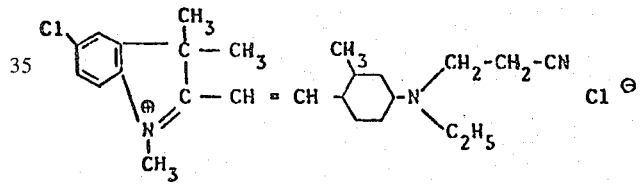

is isolated from the filtrate by one of the standard methods, such as precipitation with sodium chloride.

The dye is soluble in water and gives dyeings of bluish red shade on polyacrylonitrile and acrylonitrile copolymer fibres which have good light and wet fastness properties.

EXAMPLE 1 a

The dye of Example 1 can also be produced by reacting a compound of the formula

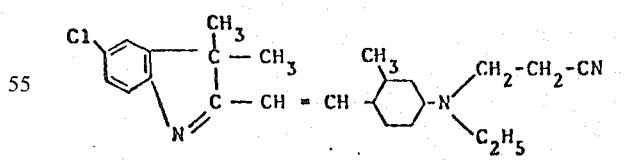

with dimethyl sulphate at temperatures in the range of 30° to 100°, preferably at 50°–70°, and if necessary in the presence of a solvent.

The styryl compound used in this Example can be prepared by condensation of the aldehyde as in Example 1 with 5-chloro-2,3,3,-trimethylindolenine by one of the known methods.

This alternative procedure can be employed to synthesize virtually all the dyes described in the following Examples 2 to 13.

EXAMPLE 2

The aldehyde used in Example 1 is replaced by the equivalent amount of an aldehyde of the formula

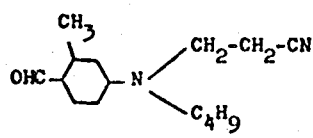

and the reaction carried out in conformity with that Example to yield a dye of comparably good quality which, like the former, gives bluish red dyeings of good fastness on polyacrylonitrile and acrylonitrile copolymer fibres.

APPLICATION EXAMPLE

A mixture of 20 parts of the dye of Example 1 and 80 parts of dextrin is ground in a ball mill 48 hours to form a dyeing preparation. One part of this is pasted with 1 part of 40 percent acetic acid, and 400 parts of distilled water at 60° are run over the paste with thorough stirring. After boiling for a short time a solution is formed which is diluted with 7600 parts of distilled water and set for dyeing with 2 parts of glacial acetic acid.

100 Parts of a fabric of polyacrylonitrile fibre are pretreated for 10–15 minutes at 60° in a bath of 8000 parts of water and 2 parts of glacial acetic acid. The fabric is then entered into the dyebath as above at 60°, the bath is raised to 100° in 30 minutes and the fabric dyed for 1 hour at this temperature. On removal it is rinsed and dried. A level bluish red dyeing is obtained which has good light and wet fastness properties.

The structural composition of further dyes is shown in the following table. These dyes can be produced by the procedure of Example 1 and correspond to the formula

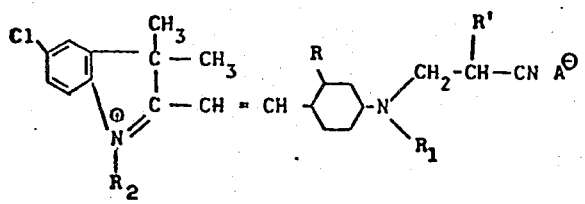

where $R$, $R_1$, $R_2$ and $R'$ have the meanings given in the table. The anion $A^\ominus$ may be any one of those named in the foregoing description.

Formulae of representative dyes of the foregoing Examples are as follows:

EXAMPLE 1

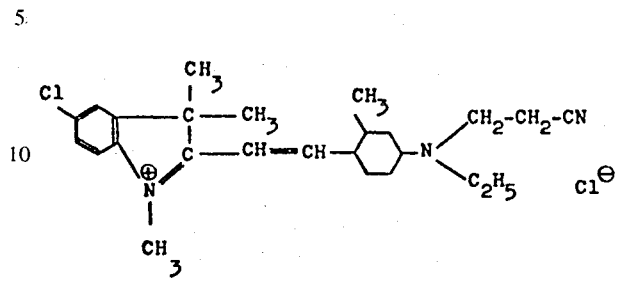

EXAMPLE 2

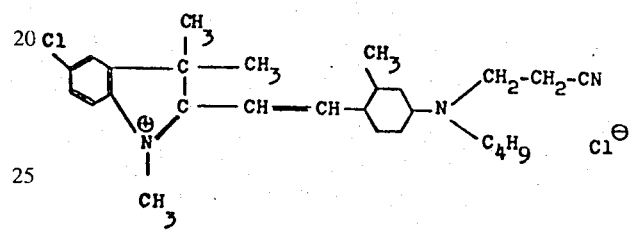

EXAMPLE 5

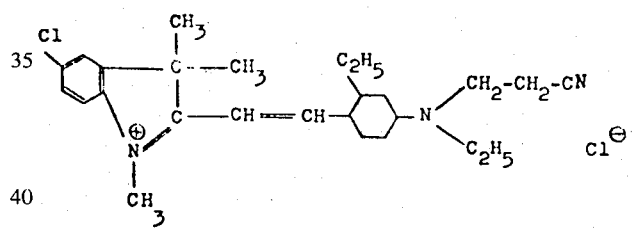

EXAMPLE 8

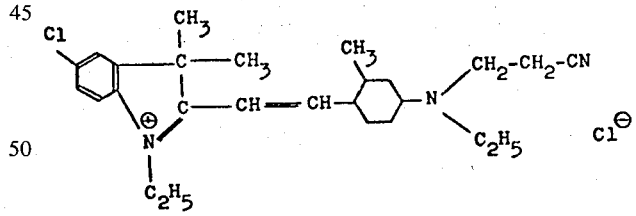

Table

| Exmp. No. | R | $R_1$ | $R_2$ | $R'$ | Shade of dyeing on polyacrylonitrile fibre |
|---|---|---|---|---|---|
| 3 | —CH₃ | —C₃H₇ | —CH₃ | H | bluish red |
| 4 | do. | —CH₂—CH(CH₃)₂ | do. | H | do. |
| 5 | —C₂H₅ | —C₂H₅ | —CH₃ | H | do. |
| 6 | do. | —C₃H₇ | do. | H | do. |
| 7 | do. | —C₄H₉ | do. | H | do. |
| 8 | —CH₃ | —C₂H₅ | —C₂H₅ | H | do. |
| 9 | do. | —C₄H₉ | do. | H | do. |
| 10 | —C₂H₅ | —C₂H₅ | —C₂H₅ | H | do. |
| 11 | do. | —C₂H₄Cl | —CH₃ | H | do. |
| 12 | —C₂H₅ | do. | do. | H | do. |
| 13 | —CH₃ | do. | —C₂H₅ | H | do. |

Having thus disclosed the invention what we claim is:
1. A compound of the formula
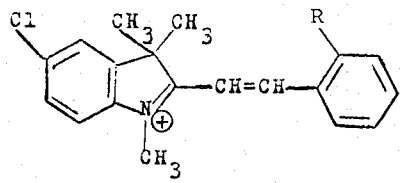
wherein
a. R is methyl, and
R''₁ is ehtyl, or
b. R is ethyl, and
R''₁ is 2-chloroethyl, and
A⊖ is an anion.
2. A compound according to claim 1 of the formula
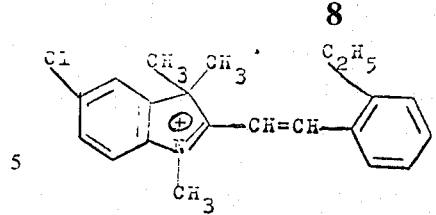
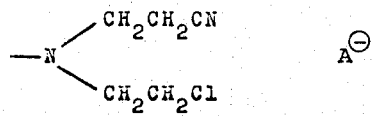
wherein A⊖ is an anion.
3. A compound according to claim 1 of the formula
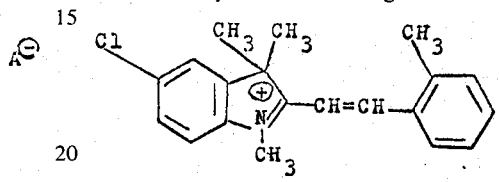
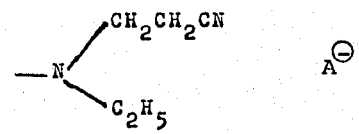
wherein A⊖ is an anion.
4. The compound according to claim 3 wherein A⊖ is Cl⊖.
* * * * *